United States Patent
Ramsey, III et al.

(10) Patent No.: US 6,335,861 B1
(45) Date of Patent: Jan. 1, 2002

(54) INSTRUMENT PLATFORM USING MODULAR COMPONENTS

(75) Inventors: Maynard Ramsey, III; Darryl Parmet, both of Tampa, FL (US)

(73) Assignee: CardioCommand, Inc., Tampa, FL (US)

( * ) Notice: Subject to any disclaimer, the term of this patent is extended or adjusted under 35 U.S.C. 154(b) by 0 days.

(21) Appl. No.: 09/259,933

(22) Filed: Mar. 1, 1999

(51) Int. Cl.⁷ .............................. G06F 1/16; H05K 5/00; H05K 7/14
(52) U.S. Cl. .................. 361/686; 361/683; 361/796; 312/223.2; D14/106; D14/107; D14/100; 364/708.1
(58) Field of Search ................... 361/679, 680, 361/681, 682, 683, 686, 725, 728, 731, 736, 796; D14/107, 100, 101, 106; 364/708.1; 312/223.1–223.3

(56) References Cited

U.S. PATENT DOCUMENTS

| | | | |
|---|---|---|---|
| 3,054,024 A | | 9/1962 | Van Dillen et al. |
| 4,131,851 A | | 12/1978 | Martiny et al. |
| 4,501,460 A | | 2/1985 | Sisler |
| 5,097,388 A | * | 3/1992 | Buist et al. ................. 361/686 |
| 5,157,585 A | * | 10/1992 | Myers ........................ 361/380 |
| 5,257,163 A | | 10/1993 | Buist et al. |
| 5,294,994 A | | 3/1994 | Robinson et al. |
| 5,331,509 A | * | 7/1994 | Kikinis ...................... 361/686 |
| 5,526,493 A | * | 6/1996 | Shu ............................ 361/686 |
| 5,537,343 A | * | 7/1996 | Kikinis et al. ........... 364/708.1 |
| 5,557,506 A | * | 9/1996 | Wood et al. ................. 361/796 |
| 5,619,398 A | * | 4/1997 | Harrison et al. ............ 361/686 |
| 5,689,406 A | | 11/1997 | Wood et al. |
| 5,756,978 A | * | 5/1998 | Soltesz et al. .............. 235/380 |
| 5,761,045 A | | 6/1998 | Olson et al. |
| 5,796,592 A | | 8/1998 | Tanaka |
| 5,838,541 A | * | 11/1998 | Mesfin et al. ............... 361/686 |
| 6,018,456 A | * | 1/2000 | Young et al. ............... 361/684 |
| 6,078,407 A | * | 6/2000 | Ma ............................. 358/474 |

FOREIGN PATENT DOCUMENTS

EP 0407068 A2 * 9/1991 ............. G06F/1/16

* cited by examiner

Primary Examiner—Leo P. Picard
Assistant Examiner—Lisa Lea-Edmonds
(74) Attorney, Agent, or Firm—George H. Gerstman; Seyfarth Shaw

(57) ABSTRACT

An instrument comprises first and second modules. The modules each comprise computer electronics hardware including a display screen typically carried by the first module. The modules are separable from each other. One of the modules has a projecting bus for connection with the interior of the other module. The bus defines a plurality of sockets for removably receiving circuit boards of desired variable types for direct connection with electronics within the other module and for connection with electronics of the one module through the bus. Thus, the instrument is easily modified in its functioning by addition, subtraction, or replacement of circuit boards from the bus.

21 Claims, 3 Drawing Sheets

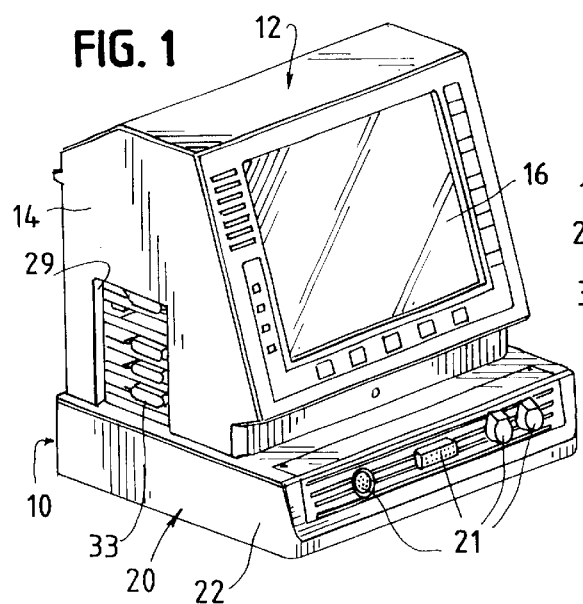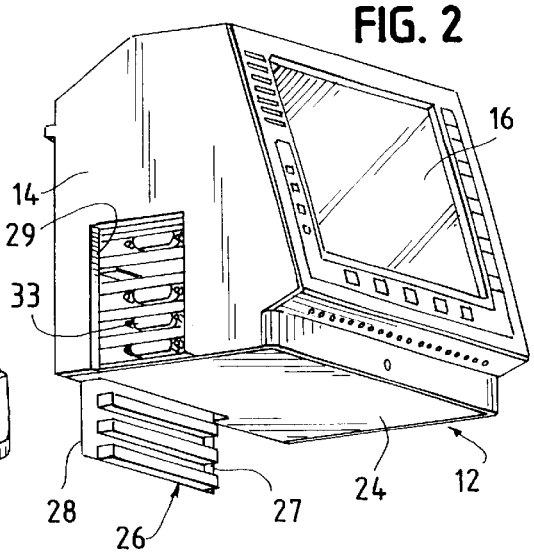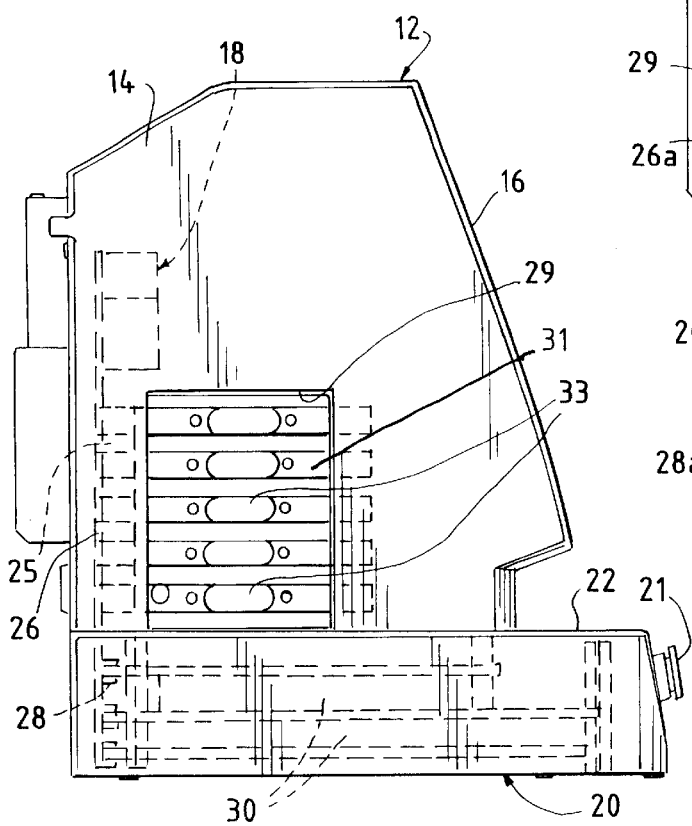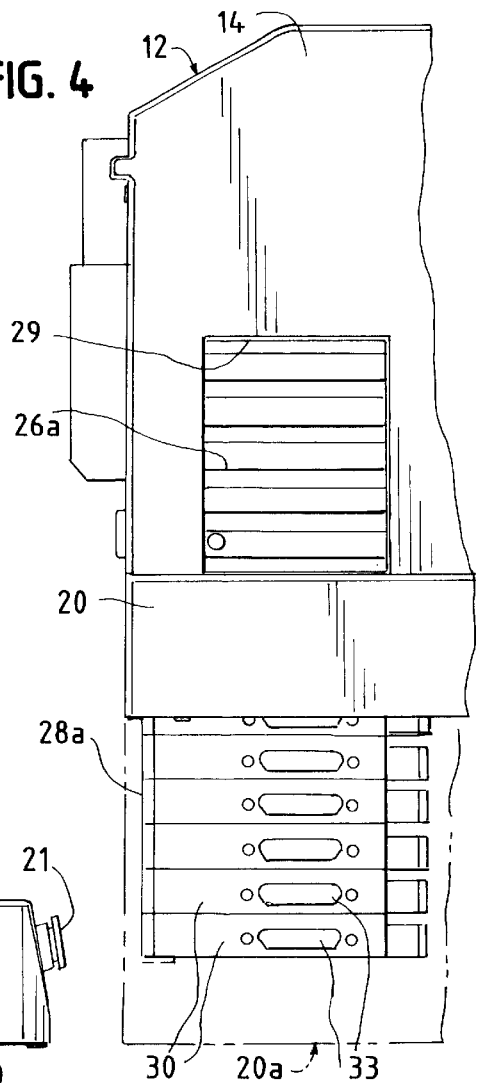

INSTRUMENT PLATFORM USING MODULAR COMPONENTS

BACKGROUND OF THE INVENTION

It is often desirable to have a computer-based instrument that is attractive, user-friendly, and relatively easy to construct. However, a standard personal computer is often not capable of performing a specific application without using auxiliary devices that have to be coupled to the personal computer in a way that is complicated and/or unattractive. For example, it has become common to connect a personal computer by cables to an auxiliary electronic container which holds the specific electronics for the desired application, which are not found in a typical personal computer, such as separate special power supplies, sensor systems such as optical, magnetic, sonic, and/or chemical sensors, strain gauges, process control units, temperature sensors, and any other desired application specific hardware and/or software for a specific application. Other features that may be required are a keyboard, a video camera, a scanner, additional storage media, additional connectors, and other computer peripheral equipment for application-specific needs.

In the state of the art, these auxiliary containers may comprise "lunch boxes" and rack mounted computers. However there are many applications not suited for such auxiliary containers, since they may need to operate in an environment where the computer needs to be aesthetically appealing and/or unitarily connected without the visible connection through wires or cables.

Such devices having these requirements may comprise medical instruments, equipment for private consumers, public access information systems, transportation based computer systems in vehicles, security application computers, consumer specialty equipment, and equipment that operates in difficult environments such as out-of-doors. Such devices are desirably unitary in their construction, rather than comprising a pair of containers connected by wires and cables, which might be tampered with by the users, separated, or the like. Also, cables connecting separate containers can become separated causing the computer to fail, perhaps in an environment where the users are very busy or very unknowledgeable about computers, and thus are not capable of resecuring the cables.

Nevertheless, because of the rapid change in the information age, there always is a need to have the capability for easy modification of computer systems. Despite providing a unitary device, the instruments of this invention are highly modifiable, with application specific hardware of the auxiliary module being capable of easy modification and even complete replacement, without the need to replace the basic computer.

DESCRIPTION OF THE INVENTION

By this invention, an instrument is provided which comprises a first module and a second module. The respective modules each generally comprise housings having computer electronics hardware including a display screen which is carried by one of the housings. The modules are separable from each other.

One of the modules carries a projecting bus for connection into the other module. The bus defines a plurality of sockets for removably receiving circuit boards (or the like) of desired variable types for direct connection with electronics within the other module, and for connection with electronics of the one module through the bus. Thus, the instrument is easily modified in its functioning by addition, subtraction, or replacement of circuit boards from the bus.

Preferably, the display screen comprises a flat panel display. It is also preferable for the first module to carry the flat panel display screen and at least substantially enough computer electronic hardware to comprise an operating computer. The second module then serves as the auxiliary, module, carrying application specific hardware for use in conjunction with the operating computer of the first module.

Also, the first module preferably carries the projecting bus, in which the bus comprises a planar member, such as a backplane. The planar member may have a plurality of electrically conductive lines, for separate communication of signals between electronic hardware located in the first and second modules.

The bus or planar member may define a plurality of slots, corresponding to the sockets described above, which slots are electrically connected to the electrically conductive lines. At least some of the slots are positioned within the second module when the first and second modules are connected with each other, with the bus carried by the first module projecting through an aperture into the second module to accomplish this. At least one circuit board or the like of the application specific hardware in the second module can then be removably connected with one of that plurality of slots.

The first module may also comprise an upper enclosure portion which carries the preferable flat panel display screen. The upper enclosure portion is connected to the remainder of the housing of the first module by a hinged system, to permit the upper enclosure portion to be pivoted upwardly to expose the interior of the first module, and then to be pivoted downwardly into closed position enclosing the electronics of the first module.

Thus, the instrument of this invention comprises a computer based, embedded instrument platform which is modular and configurable, and extensible in design and implementation. The first module, which preferably comprises a functioning computer, may be called the display, input and processing unit (DIPU), and comprises an enclosure which typically encompasses at least a major portion of the platform processing unit. A display unit and a user input unit may comprise a touch screen, a set of soft keys adjacent to the display unit, and/or a plug-in or integrated keyboard. A pointing device such as a mouse, track ball, or touch pointing device may also be used.

In the most sparse system configuration, the DIPU stands alone, providing additional computer board slots through the bus into which application-specific circuitry can be inserted if and as needed in the form of custom circuit boards.

In a multi-module configuration, the DIPU may be connected to the second module, known as the application-specific circuitry unit (ASCU). Alternatively, it may comprise the user's instrumentation enclosure (of any size) with a portion of the DIPU projecting into the user-provided enclosure (corresponding to the second module).

The ASCU (second module) may be user designed and configured, or it may be one which comes from a manufacturer. The DIPU and the ASCU (first and second modules) may be attached rigidly to each other, with the bus projecting preferably from the DIPU, through an aperture into the ASCU. Thus, circuit boards and the like may be inserted into the bus within the ASCU so that such circuit boards, even though they are within the ASCU (second module), may become an effective, integral part of the electronics of the first module (DIPU) without using cables or wires for connection.

As previously stated, the bus may comprise a backplane projecting into the second module. For example, the backplane may be replaceable by another having a different number of slots for receiving respective circuit boards. Some of the slots may occupy the interior of the first module. Another of the slots may occupy the interior of second module. For example, the first module (DIPU) may contain four of the slots, and the attached second module may have access to three slots of the backplane or bus within its interior, or any desired number of slots. Because of this flexibility, much or most of the hardware of the system of this invention will resist obsolescence, since various components can be replaced, for example the bus, to receive different numbers of circuit boards as may be desired. The individual circuit boards may correspondingly be replaced to preserve the utility of the remaining components. Also, if desired, the entire second module may be replaced with a new second module and newly contained electronics, while the first module and its components remain usable without obsolescence.

Thus, by this invention, a flexible and easy integration of new electronic hardware with existing equipment is provided, as well as the easy construction of complete, new instrument systems which are both cosmetically appealing and deployable into environments which are not suited for multiple module or housing configurations connected with wires or cables, including the types of uses described above.

DESCRIPTION OF THE DRAWINGS

In the drawings,

FIG. 1 is a upper perspective view of a first module connected to a second module in accordance with this invention;

FIG. 2 is a lower perspective view of the first module of FIG. 1;

FIG. 3 is a longitudinal sectional view of the first module of FIGS. 1 and 2, shown to be connected with a second module;

FIG. 4 is an enlarged fragmentary longitudinal sectional view of the first module of FIG. 1 connected to a different embodiment of second module, with the first module carrying a different backplane or bus.

DESCRIPTION OF SPECIFIC EMBODIMENTS

Figure 5:
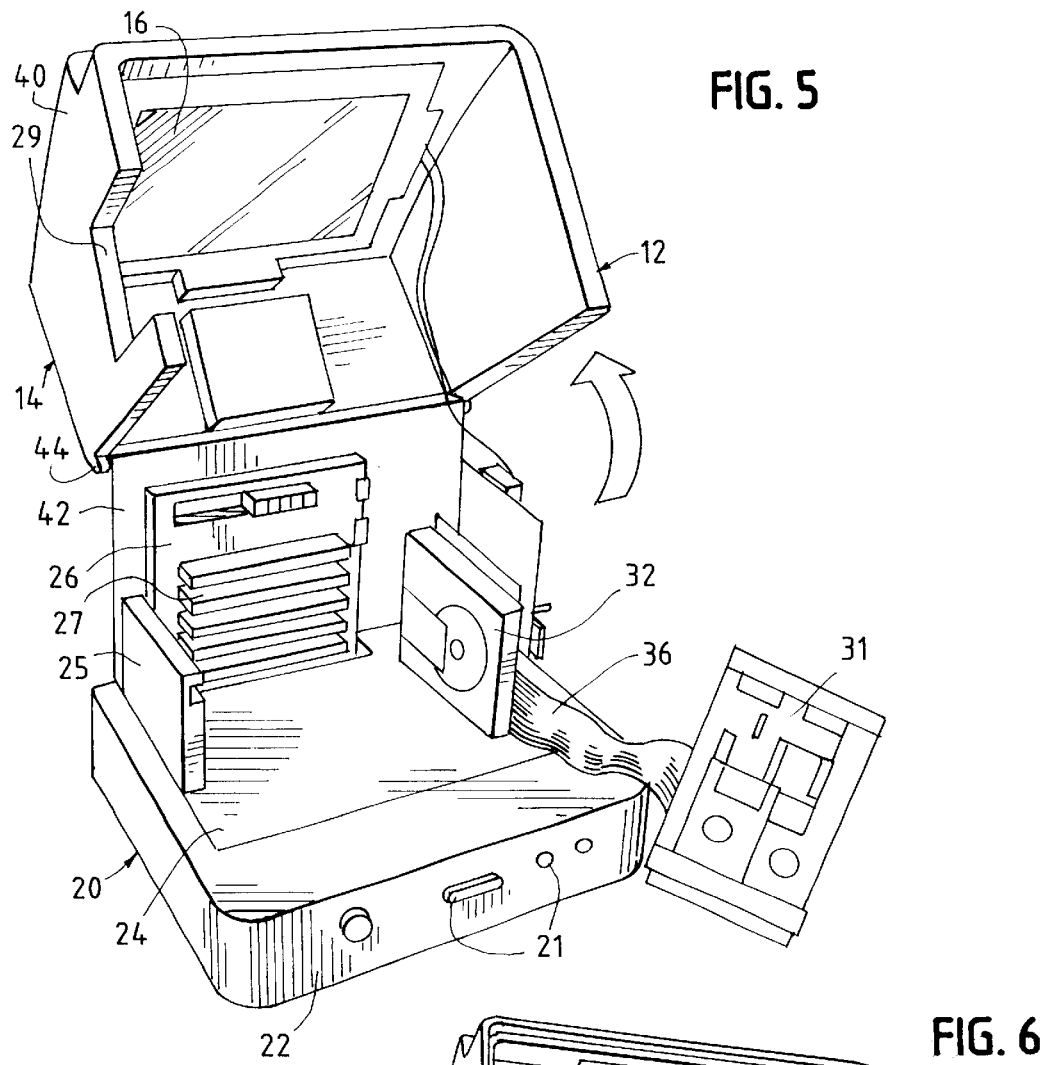
FIG. 5 is a perspective view of the first and second modules of FIG. 3, with the upper enclosure portion of the housing of the first module shown to be in the open position.

Referring to the drawings, an instrument 10 is disclosed which comprises a first module 12 comprising an outer housing 14, which carries a flat panel display unit set 16 such as an LCD display. First module 12 contains electronics 18, capable overall of operating as an independent computer apart from other electronics that may be connected to the system.

The system shown also defines a second module 20, which comprises a second housing 22 and is separable from first module 12.

FIG. 2 shows first module 12 separated from second module 20. As shown, housing 14 of first module 12 has a bottom wall 24, and a downwardly projecting bus 26, in the form of a backplane, having slots 27 for receiving circuit boards. Backplane 26 is of the form that is removable and replaceable, so that differing size backplanes may be carried by first module 12 which, in turn, receives differing numbers and types of circuit boards or other electronic components in electrically conductive relation therewith.

As illustrated in FIG. 5, bottom wall 24 supports an upright 25 that has slots which align with slots 27 for receiving the sides of the circuit boards which are received within slots 27 of backplane 26. As illustrated in FIGS. 1–4, housing 14 defines an opening 29 at its side to provide access to upright 25 and the sides of the circuit boards therein. In this manner, external electrical connection can be made to connectors 33 of the circuit boards through opening 29 of housing 14.

FIG. 3 shows how backplane 26 has an upper portion 25 that is carried within the housing 14 of first module 12 and secured therein, but that the downwardly projecting portion 28 of backplane 26 may pass through a slot in the housing 22 of second module 20, to be enclosed by second module 20 and to receive desired circuit boards 30 that occupy second module 20, while communicating via bus 26 with the electronics of first module 12. These circuit boards 30 are not included in FIG. 3, but are so included in the embodiment of FIG. 4, in which the first module 12 carries a longer backplane projecting portion 28a having capacity for connecting more circuit boards within a third module 20a. Circuit boards 30 are shown to be installed in the lower projecting backplane portion 28a that projects downwardly from first module 12 and through second module 20 into third module 20a. Conversely, the slots of the backplane within first module 12 are shown to be empty of circuit boards in FIG. 4, while carrying circuit boards 31 in FIG. 3. The desired circuit boards will be inserted in both the respective modules to engage with the backplane 26.

In both embodiments of FIG. 3 and FIG. 4, other conventional electronics which are not shown in the drawings may be present within each of the modules.

Figure 6:
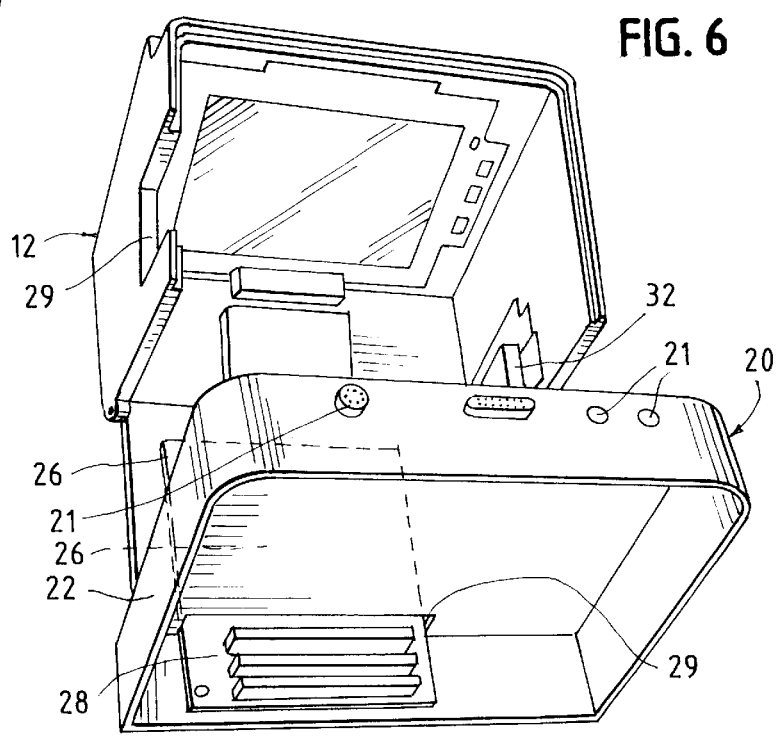
FIG. 6 is a lower perspective view of the first and second modules of FIG. 5.

FIG. 6 particularly shows how backplane 26 of FIG. 3 can have its lower portion 28 extending through an aperture 29 of the housing wall 22 of second module 20, while the backplane is also carried by first module 12. FIG. 5 shows a conventional disk drive 32 connected to a circuit board 31 by a flat, multiconnector cable 36. This permits circuit board 31, which could comprise the basic motherboard for the computer, including microprocessor, RAM, etc., to be placed into engagement with one of the sockets 27 of backplane or bus 26 for plural electrical connection therewith, with separate communication of signals between circuit board 31 and other electronic hardware located in the first and second modules. Slots 27 are thus electrically connected to the electrically conductive lines of cable 36.

FIGS. 5 and 6 also show how housing 14 of first module 12 has an upper enclosure portion 40, which is connected to the remainder of first housing 42 by a hinge 44, to permit upper enclosure portion 40 to be pivoted upwardly to expose the interior of first module 12. Upper enclosure portion 40 carries flat panel display screen 16. Thus, access to the interior of first module 12 is easy.

By this invention, first module 12 may carry the necessary electronics, including desired circuit boards 31, to typically function as an operating computer. Second module 20, while separable from first module 12, may include various controls and connectors 21 and may carry desired circuit boards 30 and other electronics for a desired application-specific use, examples of which have been described above. Second module 20 may also carry other desired components such as sensor systems, strain gauges, temperature sensors and other process control units, so that by the simple connection of the first and second modules, an instrument for a specific application is provided. Upon change of desired use, the second module may be completely replaced without the need to modify the first module, which tends to be the more general in function of the respective modules.

Also, as previously described, the first module may be inserted into a second module which is a large housing of emplaced specialized components in a factory process line, an analytical laboratory, or the like. Alternatively, a second module may be assembled by a manufacturer and sold with the first module for a particular application. Thus, first module 12 may be used for various medical functions, for example. The first module may be added to a second module especially adapted for the monitoring of heart function, with connections to electrodes for monitoring the patient. Then, first monitor 12 may be moved and connected with a second module which is especially adapted for medical analysis of body fluids.

Figure 7:
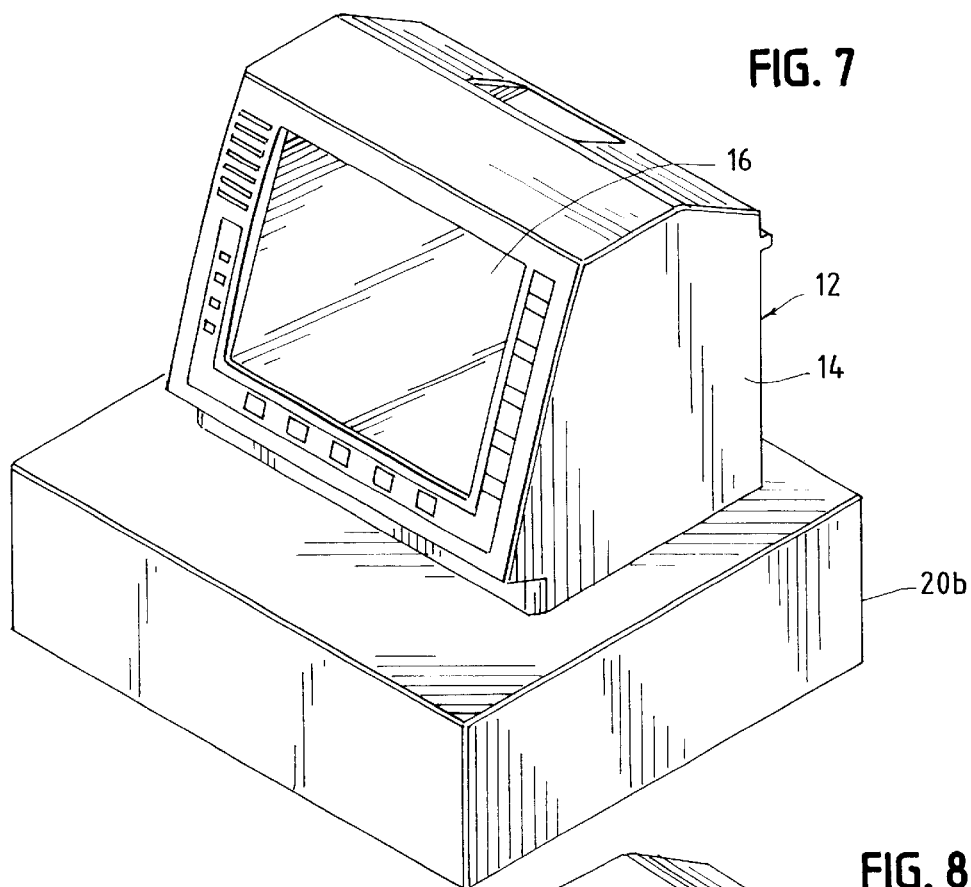
FIG. 7 is a perspective view of the first module of FIG. 1, shown connected to another design of second module.

FIG. 7 is a perspective view showing first module 12 seated on a second module 20b having a height and an interior volume which is intermediate between modules 20 and 20a, and without controls 21 as in second module 20. Thus, a backplane of intermediate length between backplanes 26 and 26a may be used, when that is desirable.

Figure 8:
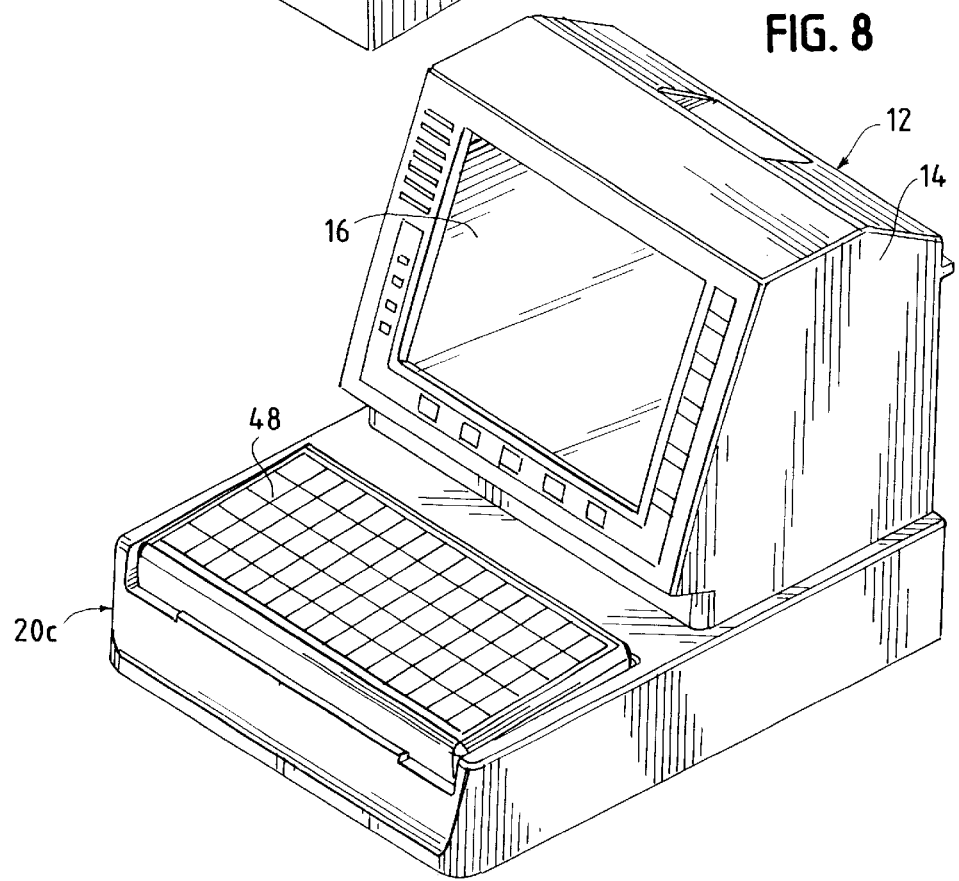
FIG. 8 is a perspective view of the first module of FIG. 1 shown connected to yet another embodiment of second module.

FIG. 8 shows the same first module 12 carried on another second module 20c. This particular module 20c carries a keyboard 48 and desired electronic and other instrumentation for any particular use. Alternatively, as stated above, separate keyboards and other auxiliary electronic equipment may be attached to first module 12 through a wire or cable. First module 12 may thus be easily connected with any of a series of second modules 20 through 20c and more, to provide a system of great flexibility in its use.

The device of this invention may thus comprise a complete, PC based instrument platform for use in specialty applications that utilize embedded computers, including medical electronics. The use of the invention eliminates much of the development time and cost required to complete an embedded, PC-based medical device instrument, since the first module, which is generally of predetermined design, can connect with a second module as a system that is both cosmetic and rugged. It is quick and easy for developers of particular applications for computers to go from concept, to test, and to final production. By this invention, the enclosure, display, power supply, battery, and PC substantive systems can be provided with additional space and slots for custom circuitry. The designer only has to create the application software, for example in Windows, DOS, or UNIX, and any specific hardware required for the application.

The first module, called the DIPU above, may for example contain a five slot ISA or PCI bus, a scaleable PC ISA single board computer starting at 133 MHz 586 with 32 M ram, a PC-104 bus connector, a 10.4" TFT VGA display with optional touch capability, an internal disk drive, and standard PC interface ports.

The ASCU module (second module 20) can be both mechanically and electrically attached to DIPU 10 and can provide an additional three ISA or PSI bus connectors of backplane 26 for oversized circuit boards or other components such as disk drives, pumps, valves, actuators, or other electronic peripherals. Larger mother boards and other bus standards may also be used.

Additionally, the DIPU first module 10, with or without the optional ASCU module 20, can be mechanically attached directly to the user's existing equipment enclosure to instantly provide a command and control module for the whole system, as well as an enabling network for internet connectivity for any device or machine. In other words, the user existing equipment enclosure may become the second module. The complete command and control portion of the total system is thus instantly available.

Power for the system may be supplied by an external AC or 24 V DC supply (or base system source of 24V), and the internal batteries and charger circuit of the DIPU (first module) may power the system for approximately two hours of portable use or backup in case of power failure.

In contrast to traditional, industrial or flat panel embedded computer plant forms, the instrument of this invention is cosmetically designed for end user acceptance. The respective housings may be constructed entirely of cast aluminum and/or stainless steel to provide good cosmetics, ruggedness, EMC control, and corrosion resistance. Use of other materials, such as plastic, is also contemplated.

Also, modules in accordance with this invention may be customized for application-specific components as a secondary operation by the manufacturer or customer if needed. The modules may be smaller than typical PC based subsystems and may be mountable on a table, instrument enclosure, equipment console, wall, IV pole, or mobile stand. Because of the cosmetic improvements and the security provided in the separable but linked modules, the instrument of this invention may be deployable in many previously unsuitable environments for PC based instruments, as well as the traditional test and measurement, data acquisition, medical instrumentation, telemedicine, robotics, automation, EMS, marine, security, military, information kiosks, and POS missions, by way of example.

The above has been offered for illustrative purposes only, and is not intended to limit the scope of the invention of this application, which is as defined in the claims below.

That which is claimed:

1. An instrument which comprises:
   a first module;
   a second module;
   the respective modules comprising computer electronics hardware including a display screen carried by one of said modules, said modules being separable from each other;
   one of said modules having a bus projecting beyond said one module for connection with the interior of the other module, said bus defining a plurality of sockets for removably receiving circuit boards of desired, variable types for direct connection with an electronics within the other module and for connection with electronics of the one module through said bus, where the instrument is easily modified in its functioning by addition, subtraction, or replacement of circuit boards from said bus.

2. The instrument of claim 1 in which said display screen comprises a flat panel display.

3. The instrument of claim 2 in which said first module carries said flat panel display screen and at least substantially enough of said computer electronics hardware to comprise an operating computer.

4. The instrument of claim 3 in which said first module comprises a housing having an upper enclosure portion which carries said flat panel display screen, said upper enclosure portion being connected to the remainder of said housing by a hinge system to permit said upper enclosure portion to be pivoted upwardly to expose the interior of said first module.

5. The instrument of claim 3 in which said first module carries said projecting bus, said bus comprising a planar member.

6. The instrument of claim 5 in which said planar member has a plurality of electrically conductive lines for separate communication of signals between electronic hardware located in said first and second modules.

7. The instrument of claim 6 in which said planar member defines a plurality of slots which are electrically connected to said electrically conductive lines, at least some of said slots being positioned within the second module when the first and second modules are connected with each other.

8. The instrument of claim 7 in which said second module comprises a keyboard.

9. The instrument of claim 7 in which said second module contains application specific hardware and software including at least one circuit board removably connected with one of said plurality of slots.

10. The instrument of claim 5 in which said projecting bus comprises a planar member which has a plurality of electrically conductive lines for separate communication of signals between electronic hardware located in said first module and another module to which first module is connected.

11. The computer of claim 10 in which said planar member defines a plurality of slots which are electrically connected to said electrically conductive lines, at least some of the slots positioned outwardly from said first module to be positioned within another module connected with said first module.

12. The instrument of claim 1 in which said first module is defined by a first housing wall and said second module is defined by a second housing wall, one of said housing walls carrying the display screen, said first and second housing walls abutting together when said first and second modules are joined together.

13. A computer which comprises a first module, said first module comprising computer electronic hardware including a display screen and other hardware sufficient to provide a functioning computer, said first module carrying a bus projecting outwardly beyond said first module for connection with the interior of another module, said bus defining a plurality of sockets for removably receiving circuit boards of desired variable types for direct connection with electronics within the other module, and for connection with electronics of the first module through said bus, whereby said computer may be joined with auxiliary electronic instruments for desired, variable function.

14. The computer of claim 13 in which said first module comprises a housing having an enclosure portion which carries said flat panel display screen, said enclosure portion being connected to the remainder of said housing by a hinge system to permit said enclosure portion to be pivoted outwardly to expose the interior of said first module.

15. An instrument which comprises:

a first module having a first housing which carries a flat panel display screen;

a second module;

the respective modules comprising computer electronics hardware, said modules being separable from each other;

one of said modules having a bus project outwardly beyond the one module for connection with the interior of the other module, said bus defining a plurality of sockets for removably receiving circuit boards of desired viable types for direct connection with electronics within the other module and for connection with electronics of the one module through said bus, whereby the instrument is easily modified in its functioning by addition, subtraction, or replacement of circuit boards from said bus, said second module containing application specific hardware and software including at least one circuit board removably connected with one of said plurality of sockets.

16. The instrument of claim 15 in which said first module comprises a housing having an upper enclosure portion which carries said flat panel display screen, said upper enclosure portion being connected to the remainder of said first module by a hinge system to permit said upper enclosure portion to be pivoted upwardly to expose the interior of said first module.

17. The instrument of claim 16 in which said first module carries said flat panel display screen and at least substantially enough of said computer electronics hardware to comprise an operating computer.

18. The instrument of claim 17 in which said first module carries said projecting bus, said bus comprising a planar member.

19. The instrument of claim 18 in which said planar member has a plurality of electrically conductive lines for separate communication of signals between the electronic hardware located in said first and second modules.

20. The instrument of claim 19 in which said planar member defines a plurality of slots which are electrically connected to said electrically conductive lines, at least some of said slots being positioned within the second module when the first and second modules are connected with each other.

21. The instrument of claim 20 in which said second module comprises a keyboard.

* * * * *